US009628191B2

United States Patent
Xie et al.

(10) Patent No.: US 9,628,191 B2
(45) Date of Patent: Apr. 18, 2017

(54) METHODS, OPTICAL TRANSMITTER, OPTICAL MODULE, AND OPTICAL COMMUNICATION SYSTEM FOR IMPROVING THE MONITORING AND/OR REPORTING ACCURACY OF A LASER TRANSMITTING POWER

(71) Applicant: SOURCE PHOTONICS (CHENGDU) CO., LTD., Chengdu, Sichuan (CN)

(72) Inventors: Chuxu Xie, Chengdu (CN); Yuanjun Huang, Chengdu (CN); Yuanzhong Xu, West Hills, CA (US)

(73) Assignee: Source Photonics (Chengdu) Co., Ltd., Chengdu (CN)

( * ) Notice: Subject to any disclaimer, the term of this patent is extended or adjusted under 35 U.S.C. 154(b) by 108 days.

(21) Appl. No.: 14/424,389

(22) PCT Filed: Feb. 12, 2015

(86) PCT No.: PCT/CN2015/072956
§ 371 (c)(1),
(2) Date: Feb. 26, 2015

(87) PCT Pub. No.: WO2016/127375
PCT Pub. Date: Aug. 18, 2016

(65) Prior Publication Data
US 2016/0241343 A1 Aug. 18, 2016

(51) Int. Cl.
*H04B 17/00* (2015.01)
*H04B 10/564* (2013.01)

(52) U.S. Cl.
CPC .................................. *H04B 10/564* (2013.01)

(58) Field of Classification Search
CPC .................. H04B 10/564; H04B 10/07955
(Continued)

(56) References Cited

U.S. PATENT DOCUMENTS

| 6,885,443 B2 | 4/2005 | Schrodinger |
| 2003/0152390 A1* | 8/2003 | Stewart .................. H04B 10/40 398/135 |

(Continued)

FOREIGN PATENT DOCUMENTS

CN 103078249 A 5/2013

OTHER PUBLICATIONS

Chen Biao; "Method and Device for Generating Temperature Lookup Table of Optical Module", Bibliographic Data of CN103078249 (A); May 1, 2013; http://worldwide.espacenet.com.

(Continued)

*Primary Examiner* — Juan A Torres
(74) *Attorney, Agent, or Firm* — Andrew D. Fortney; Central California IP Group, P.C.

(57) ABSTRACT

The present application discloses a method and circuitry that improves the monitoring and/or reporting accuracy and of a TOSA transmitter output power. In the method, the output power of an optical transmitter is measured at 25° C. and at N individual temperatures to obtain N tracking error (TE) values corresponding to the N individual temperature values, then a lookup table covering an operating temperature range of the transmitter is created based on a one-to-one mapping relationship between the TE values and the N individual temperatures and a line fitting process. The transmitter output power is reported at an interface of the transmitter according to the TE value at the transmitter operating temperature in the lookup table. The present application also discloses optical modules and optical communication systems. The present method and transmitter effectively improve the monitoring and/or reporting accuracy of the transmitter output power.

20 Claims, 3 Drawing Sheets

(58) Field of Classification Search
USPC .......................................................... 398/38
See application file for complete search history.

(56) References Cited

U.S. PATENT DOCUMENTS

| | | | |
|---|---|---|---|
| 2003/0169790 A1* | 9/2003 | Chieng | ............... H01S 5/06804 |
| | | | 372/34 |
| 2005/0002019 A1 | 1/2005 | Schrodinger | |
| 2005/0180711 A1 | 8/2005 | Kamath et al. | |
| 2005/0185684 A1* | 8/2005 | Stewart | ................... H04J 14/02 |
| | | | 372/29.02 |

OTHER PUBLICATIONS

International Search Report and Written Opinion; International Searching Authority/CN dated Nov. 19, 2015; International Application No. PCT/CN2015/072956; 9 pages; International Searching Authority/State Intellectual Property Office of the P.R. China; Beijing, China.

* cited by examiner

METHODS, OPTICAL TRANSMITTER, OPTICAL MODULE, AND OPTICAL COMMUNICATION SYSTEM FOR IMPROVING THE MONITORING AND/OR REPORTING ACCURACY OF A LASER TRANSMITTING POWER

FIELD OF THE INVENTION

The present invention relates to the field of communication, especially to the field of optical communication devices. More specifically, embodiments of the present invention pertain to optical transmitters, transceivers and modules, especially to a method, optical transmitter, optical transceiver, optical module and optical communication system for monitoring and/or improving the reporting accuracy of a laser transmitting power.

DISCUSSION OF THE BACKGROUND

With regard to a transmitter optical subassembly (TOSA) in an optical module, tracking error (TE) refers to a variation between the expected optical output power at different temperatures and the measured optical output power at a normal or ambient temperature with the optical output power at the normal or ambient temperature as a reference. TE also refers to a parameter for determining the stability of optical transmitter coupling efficiency in dB. TE is a vital indicator for the stability of the output optical power of the optical module. When the TOSA transmitting optical power is monitored by an optical module in operation, the accuracy of determining and/or detecting the TOSA transmitting optical power is lower than ideal because the operation temperature of the TOSA affects the TE, and thus, the stability of the output optical power.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention is intended to overcome one or more deficiencies in the prior art, and provide a method, optical module, and optical communication system for improving the monitoring and/or reporting accuracy of a TOSA transmitter power. In order to achieve the present objective(s), the present invention provides in one aspect a method for controlling an output power of an optical transmitter, comprising measuring the output power of the optical transmitter at 25° C., measuring the output power of the optical transmitter at N additional individual temperatures to obtain N tracking error values (TE values) corresponding to the N individual temperatures, where N is an integer that is equal to or greater than 1; creating a lookup table covering an operating temperature range of the optical transmitter based on one-to-one mapping between the TE values and the N individual temperatures; reporting the output power according to an operating temperature of the optical transmitter using the lookup table when the optical transmitter is in operation. The method may further comprise performing a line fitting process on the N temperature values and the N TE values, and determining additional TE values at each of one or more temperatures between adjacent ones of the N additional individual temperature values from the line.

In various embodiments of the present method, the N individual temperature values are in the temperature range of from 20° C., 0° C. or −40° C. to 85° C. In one embodiment, the N individual temperature values may be calculated by the equation T=−40° C.+($\alpha$*M), where T represents an individual temperature value, $\alpha$ is an integer that ranges from 0 to Q, M represents a temperature interval between two adjacent one of the N individual temperature values, Q is a nearest integer to, or an integer rounded up or down from, 125/M. M may be from 3° C. to 30° C. (e.g., 3° C., 5° C., 10° C., 20° C. or 30° C.).

In another embodiment of the method, reporting the output power comprises determining an actual temperature of the optical transmitter, reading the TE value corresponding to the actual temperature from the lookup table, and adjusting data at an interface of the optical transmitter (e.g., DDMI data) using the TE value from the lookup table. Typically, the optical transmitter comprises a laser diode configured to transmit an optical signal and a monitoring photodiode configured to feed back a signal having a value corresponding to the output power of the laser diode.

In a second aspect, the present invention provides an optical transmitter, including a laser driver and a TOSA connected thereto, a temperature data collector, a microprocessor, and a lookup table. The temperature data collector is configured to determine and report the operating temperature of the TOSA in real time. The microprocessor is connected with the TOSA via the temperature data collector and is configured to receive the operating temperature from the temperature data collector, and report an output power of the TOSA according to a TOSA TE value at the operating temperature in the lookup table when the TOSA is in operation. Further, the lookup table may be made in advance and may contain the TOSA TE values at various temperatures and corresponding temperatures in a one-to-one mapping relationship.

The lookup table may contain the TOSA TE values at various temperatures and corresponding temperatures (e.g., TE values from an output power of the TOSA measured at N individual temperatures, where N is an integer that is greater than 1). The TOSA TE values may also include TE values at temperatures other than the N individual temperature values, determined from a line fitted to the TE values from the measured output powers of the TOSA and the N individual temperature values. In general, the N individual temperature values are from 20° C. to 85° C., but may also be from 0° C. to 85° C., or from −40° C. to 85° C. The N individual temperature values may be determined by the equation T=−40° C.+($\alpha$*M), where T represents an individual one the N additional individual temperature values, $\alpha$ is an integer that ranges from 0 to Q, M represents a temperature interval between two adjacent temperature values of the N additional individual temperature values, and Q is a nearest integer to, or an integer rounded up or down from, 125/M. As described above, M may be from 3° C. to 30° C.

In one or more embodiments, the microprocessor includes the lookup table. Alternatively, the optical transmitter may further comprise a memory storing the lookup table, and the memory is readable by the microprocessor. In further embodiments, the optical transmitter (or an optical transceiver including the optical transmitter) further comprises an interface (e.g., a digital diagnostic and/or monitoring interface) that reports the TE value from the look-up table to an external device (e.g., such as a host).

In a third aspect, the present invention further provides an optical module, comprising the present optical transmitter, and/or an optical communication system, including one or more optical communication devices and the present optical module, wherein the optical communication device(s) are connected with the optical module. Generally, the optical module further comprises an interface (e.g., a digital diagnostic and/or monitoring interface) that reports the TE value from the look-up table to the optical communication device(s). In various embodiments, the optical communication device may be a data communication optical transceiver, a telecom optical module, a fiber switch, an OLT, an ONU or a PON.

Relative to the prior art, the present invention has advantageous effects as a result of measuring the output power value of a TOSA at a plurality of individual temperatures to obtain a plurality of tracking error values (TE values) corresponding to the individual temperature values, and then creating a lookup table within the full operating temperature range by a line fitting process based on a one-to-one mapping relation between the TE values and the N individual temperature values; and reporting the TOSA TE according to temperature variations using the lookup table when the TOSA is in operation, including effectively improving the monitoring and/or reporting accuracy of the TOSA transmitting (e.g., optical output) power, and a monitoring interface (e.g., DDMI) therefor.

DETAILED DESCRIPTION

Figure 1:
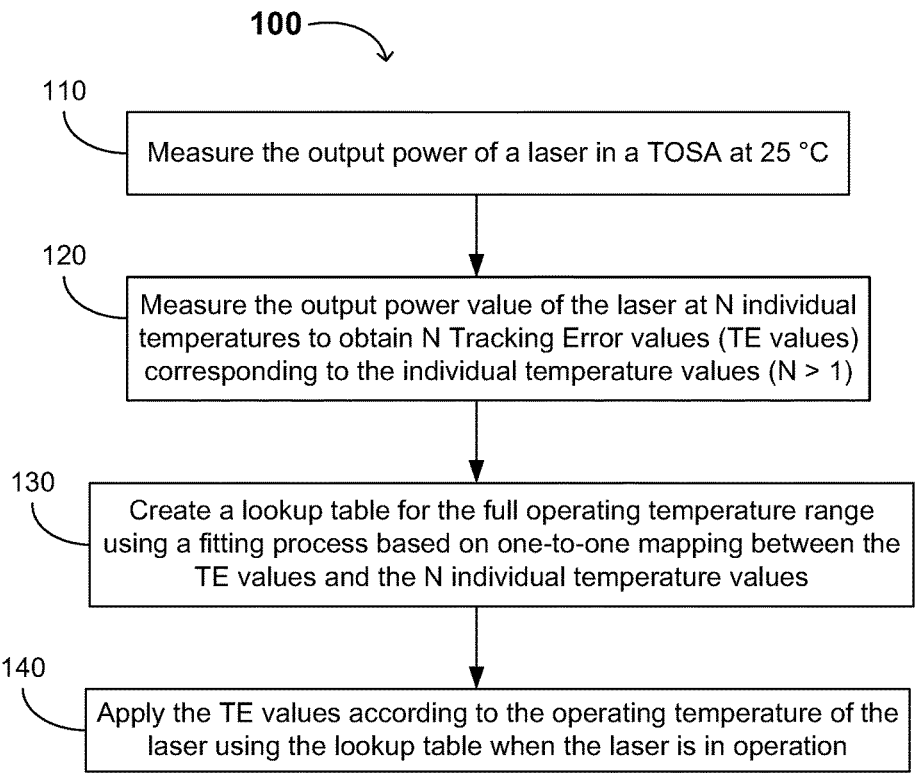
FIG. 1 is a flow chart showing an exemplary method in accordance with one or more embodiments of the present invention.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the disclosure.

Some portions of the detailed descriptions which follow are presented in terms of processes, procedures, logic blocks, functional blocks, processing, and other symbolic representations of operations on code, data bits, or data streams within a computer, transceiver, processor, controller and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or circuit. It has proven convenient at times, principally for reasons of common usage, to refer to these signals as bits, streams, values, elements, symbols, characters, terms, numbers, or the like, and to their representations in computer programs or software as code (which may be object code, source code or binary code). It should be borne in mind, however, that all of these and similar terms are associated with the appropriate physical quantities and/or signals, and are merely convenient labels applied to these quantities and/or signals.

Unless specifically stated otherwise, or as will be apparent from the following discussions, it is appreciated that throughout the present application, discussions utilizing terms such as "processing," "operating," "calculating," "determining," or the like, refer to the action and processes of a computer, data processing system, or similar processing device (e.g., an electrical, optical, or quantum computing or processing device or circuit) that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data or information similarly represented as physical quantities within other components of the same or a different system or architecture.

Furthermore, in the context of this application, the terms "signal" and "optical signal" refer to any known structure, construction, arrangement, technique, method and/or process for physically transferring a signal or optical signal, respectively, from one point to another. Also, unless indicated otherwise from the context of its use herein, the terms "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use. Similarly, for convenience and simplicity, the terms "time," "rate," "period" and "frequency" are, in general, interchangeable and may be used interchangeably herein, as are the terms "data," "bits," and "information," but these terms are generally given their art-recognized meanings.

For the sake of convenience and simplicity, the terms "optical" and "optoelectronic" are generally used interchangeably herein, and use of either of these terms also includes the other, unless the context clearly indicates otherwise, but these terms are generally given their art-recognized meanings herein. Furthermore, the term "transceiver" refers to a device having at least one receiver and at least one transmitter, and use of the term "transceiver" also includes the individual terms "receiver" and/or "transmitter," unless the context clearly indicates otherwise. Also, for convenience and simplicity, the terms "connected to," "coupled with," "communicating with," "coupled to," and grammatical variations thereof (which terms also refer to direct and/or indirect relationships between the connected, coupled and/or communicating elements unless the context of the term's use unambiguously indicates otherwise) may be used interchangeably, but these terms are also generally given their art-recognized meanings.

Various embodiments and/or examples disclosed herein may be combined with other embodiments and/or examples, as long as such a combination is not explicitly disclosed herein as being unfavorable, undesirable or disadvantageous. The invention, in its various aspects, will be explained in greater detail below with regard to exemplary embodiments.

To improve the monitoring accuracy of a TOSA (e.g., laser) transmitting power and the accuracy of the reported value of the same at an interface (e.g., a digital diagnostic and/or monitoring interface) between an optical transmitter or transceiver and an external device such as a host to which the optical transmitter or transceiver is connected, embodiments of the present invention may measure the output power value of a laser in a TOSA at a plurality of individual temperatures to obtain a plurality of tracking error values (TE values) corresponding to the individual temperature values, and then create a lookup table within an operating temperature range including (or defined by) the individual temperature values using a line fitting process based on a one-to-one mapping relationship between the TE values and the individual temperature values. When the laser or TOSA is in operation, one may read the TOSA TE value and report it at the interface to compensate for variations or differences between the actual value of the TOSA output power at the operating temperature (i.e., as determined during testing and recorded in the lookup table) and the value that would otherwise be (erroneously) measured by a monitoring photodiode. The technical proposal(s) of embodiments of the present invention will be fully and clearly described below in conjunction with the drawings.

Exemplary Methods of Making and Using a TOSA TE Lookup Table

FIG. 1 shows a flow chart 100 for an exemplary method of improving the monitoring and/or reporting accuracy of the output power of a laser that involves making and using a lookup table that maps the TE values to individual temperature values in the operating temperature range of the laser. At 110, the output power of the laser (e.g., in a TOSA of an optical transceiver) is measured at ambient temperature (e.g., 25° C.). More specifically, the laser or TOSA may be included in an optical module that complies with one or more standard packages, such as an SFP-, SFP+-, CSFP- or QSFP-compliant optical module package. Such standard-compliant packages may also have a standardized physical interface (e.g., with one or more optical fibers and/or an external device, such as a slot in a host device such as an optical switch, an optical line terminal (OLT), or an optical network unit (ONU).

At 120, the output power value of the laser is measured at N individual temperatures (e.g., other than ambient temperature or 25° C.) to obtain N tracking error values (TE values) corresponding to the N individual temperature values. N is an integer that is equal to or greater than 1. Generally, the greater N is, the more accurate the results are. However, to save time and avoid inadvertent inconsistencies in the measured TE values, N is selected such that it is an integer defined in part by the temperature range and in part by the differential between adjacent measured temperatures, as discussed below.

In addition, lasers in optical transmitters and transceivers generally operate over a temperature range that includes the range of from ambient temperature (e.g., 20-25° C.) to about 85° C. However, in some embodiments, the operating temperature range can be as low as 0° C., −20° C., or −40° C., to a maximum in some cases of about 120° C. or 135° C. Thus, the individual temperatures at which the output power value of the laser is measured may be at increments across this range (e.g., from −40° C., 0° C. or 25° C., to about 85° C., 120° C., or 135° C.). The increments may be 30° C., 20° C., 10° C., 5° C., 3° C., or any other desired value (e.g., as described below). In some embodiments, the increments may be relatively small (e.g., 3 or 5° C.) in regions of the operating temperature range where the laser is more likely to be operating (e.g., at or near ambient temperature [such as from 20° C. to 30° C.] and at or near the upper end of its safe operating range [such as from 70° C. to 85° C.]), and relatively large (e.g., 10° C.) in other regions of the laser operating temperature range.

At 130, a lookup table is created for the full operating temperature range of the laser using a line fitting process based on a one-to-one mapping relationship between the measured TE values and the N individual temperature values. With regard to the TOSA, TE (tracking error) refers to a variation between the optical output power at a temperature in the normal operating temperature range of a laser in the TOSA and the optical output power at an ambient temperature, with the optical output power at the ambient temperature as a reference. At a given laser driving current, the output power of the laser decreases as the operating temperature increases, and additional current is generally necessary to maintain a predetermined output power at temperatures higher than ambient temperature. At relatively high and relatively low temperatures, the output power of the laser as determined by a monitoring photodiode may not be as accurate as is desired due to variations caused by certain mechanics and/or shaping of the laser and the ratio of the front side optical power and backhaul or back side optical power of the laser (where the monitoring photodiode is usually located). Also, TE is a useful parameter to determine the stability of the transmitter coupling efficiency in dB. TE is a vital indicator for determining the stability of the optical module (e.g., laser) output optical power. For example, when the laser output power decreases significantly at a given driving current and temperature over time (e.g., after some hours, days, months, or years of operation), even after compensation using the TE value, it can indicate that the laser is becoming unstable or aging, and the laser may need replacement.

Figure 2:
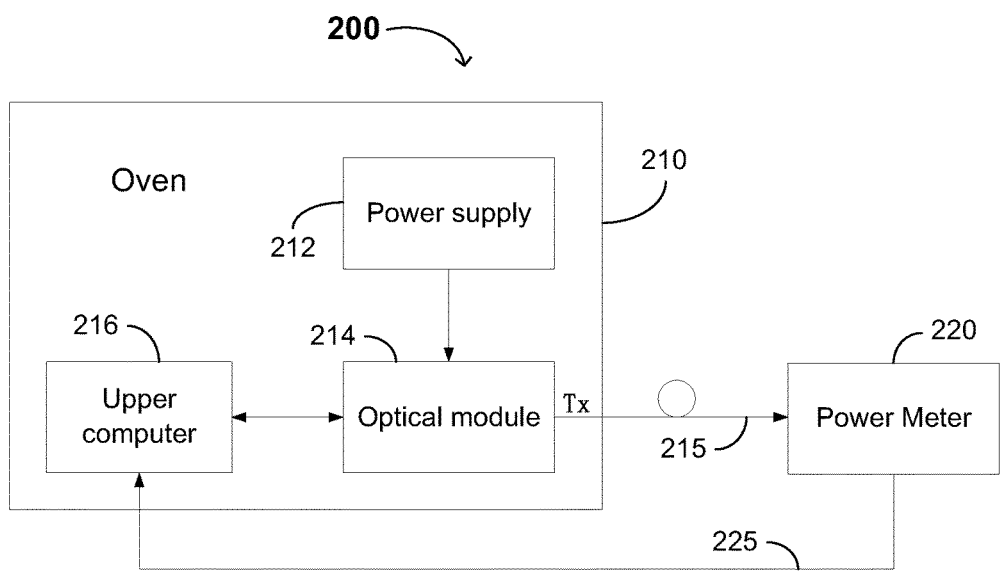
FIG. 2 is a block diagram showing an exemplary test system in accordance with one or more embodiments of the present invention.

The N individual temperature values are generally included in the operating temperature range of the TOSA (e.g., between −40° C. and 85° C.). The optical module is placed in an oven configured to provide a test temperature at a number of values within the operating range of the laser (e.g., ranging from 20° C., 0° C., or −40° C. to 85° C.) when the test is in process. As shown in the system 200 of FIG. 2, an optical module 214 is in the oven 210 when the test (e.g., the measurement of the optical output power) is in process. The optical module 214 is plugged into a test board (not shown in FIG. 2) configured to simulate the operating conditions of the optical module. In some embodiments, a standard-compliant (e.g., SFP+) optical module 214 is plugged into a test board in the oven 210 equipped with standard SFP+ slots. A power supply 212 (e.g., a 5V DC power supply) supplies power to the test board (e.g., a voltage of 3.13V~3.47V is applied to the optical module). The output terminal Tx of the optical module 214 is connected with an optical power meter 220 via a fiber 215. The optical power meter 220 is connected with an upper computer 216 (e.g., a personal computer) via GPIB connection 225. The upper computer 216 is connected with the optical module 214 via an IIC bus.

When the test is in process, various test temperatures (e.g., between 20° C., 0° C., or −40° C. and 85° C. or higher) are entered or programmed into the oven test program. At first, the test board is electrified to enable the optical module 214. The power meter 220 is utilized to determine the output power P1 of the optical module 214 at a temperature of 25° C., and then the output power P1 is read by the upper computer 216. After that, the power meter 220 is utilized to determine the output power P2 of the laser at another temperature (e.g., 20° C.). The second output power P2 is also read by the upper computer 216, and then a TE value corresponding to the other temperature (e.g., 20° C.) can be calculated via an equation (e.g., TE=10 $\log_{10}$(P2/P1)). The test temperature is changed again and the test repeated so that TE values corresponding to N individual temperature values can be calculated. Then, the upper computer 216 creates a lookup table over the full operating temperature range of the laser by a line fitting process, based on a one-to-one mapping relationship between the calculated TE values and the N individual temperature values of the test. The lookup table covers incremental temperature points over the operating temperature range of the laser (e.g., between −40° C. and 85° C.). Adjacent incremental temperature points are closer together (e.g., 1° C. or 2° C.) than adjacent temperatures in the test (e.g., 5° C.). The lookup table is written into a memory (e.g., one or more registers in the microprocessor or elsewhere in the optical module 214). More specifically, the upper computer 216 can write the original data (and, in some cases, only the lookup table data) into the microprocessor, while the calculation of the TE value and subsequent data fitting (e.g., according to the line fitting process) can be implemented by the microprocessor in the optical module.

At 140, the TE values are applied to the TOSA according to the temperature of the laser using the lookup table when the TOSA is in operation. More specifically, in some embodiments, the optical module is qualified for delivery when the test is completed and the data of the lookup table written into memory in the optical module. In use, the microprocessor in the optical module reports the tracking error of the TOSA based on the lookup table and the actual temperature of the laser in operation.

For example, reporting the output power may comprise determining an actual temperature of the optical transmitter, reading the TE value corresponding to the actual temperature from the lookup table, and reporting the TE value from the lookup table at an electrical interface (e.g., a digital diagnostic and/or monitoring interface with an external device). In various embodiments of the method, the optical transmitter comprises a laser diode configured to transmit an optical signal, and a monitoring photodiode configured to feed back a signal having a value corresponding to the output power of the laser diode. The feedback signal from the monitoring photodiode may be an analog signal (e.g., a current) or a digital signal (e.g., a voltage, which may be converted from the analog signal). A driving current from a driver to the optical transmitter may also be changed or adjusted by an amount defined by the feedback signal from the monitoring photodiode.

TE is a vital indicator for the stability of optical module output optical power. When the transmitter optical power is monitored in an optical module (e.g., that generally supports a monitoring interface, such as DDMI) in operation, the accuracy of transmitter optical power determination (e.g., using a monitoring photodiode) may decrease at relative extremes of the operating temperature (which affects the physical and/or mechanical properties of the laser diode and the stability of the output optical power). Optical output power reporting using the TE as conducted by the present invention can greatly increase the monitoring and/or reporting accuracy of the transmitter optical power at the diagnostic and/or monitoring interface.

The N individual temperature values may be determined by the following equation: T=−40° C.+($\alpha$*M), where T represents an individual one of the N temperature values, $\alpha$ is an integer of from 0 to Q, M represents a temperature interval between two adjacent temperature values, and Q is an integer nearest to (e.g., rounded up or down from) P/M, where P is the difference between the highest and lowest values of the test temperature range. In one example, P is 125, which comes from the endpoints of the operating range of one example optical module (e.g., 85° C. minus −40° C.).

Preferably, the temperature interval M is 3° C., 5° C., 10° C., 20° C. or 30° C. The smaller the temperature interval is, the larger the data size achieved by the test, and the higher the accuracy for output power compensation. If P is 125 and M is equal to 5° C., the value of $\alpha$ is 25. That is to say, 25 TE values are measured at 25 temperatures, including −40° C., −35° C., −30° C., −25° C., −25° C., −20° C., −15° C., −10° C., −5° C., 0° C., 5° C., 10° C., 15° C., 20° C., 25° C., 30° C., 35° C., 40° C., 45° C., 50° C., 55° C., 60° C., 65° C., 70° C., 75° C., 80° C. and 85° C. However, the temperature interval M could be any other temperature interval, such as 1° C., 2° C., 4° C., 15° C., 25° C., etc. The temperature interval M is not intended to be limit to a particular value, and one person skilled in the art can determine a value as the case may be, as long as the temperature interval in the lookup table for TE application is smaller than the temperature interval M.

Then, the lookup table within the full operating temperature range is created by a line fitting process based on a one-to-one mapping relationship between the measured TE values and the individual temperature values. From the measurement data, a line is fitted to the data The present method measures the output power value of a TOSA (e.g., a laser in the TOSA) at a plurality of individual temperatures to obtain a plurality of tracking error values (TE values) corresponding to the individual temperature values, and then creates a lookup table within the full temperature range by a line fitting process based on a one-to-one mapping relationship between the TE values and the N individual temperature values, and reports the optical output power of the laser in the according to the operating temperature of the laser using the corresponding TE value in the lookup table when the TOSA is in operation. Thus, the monitoring and/or reporting accuracy of the transmitter output power can be effectively improved.

Exemplary Optical Transmitters and/or Optical Modules

Figure 3:
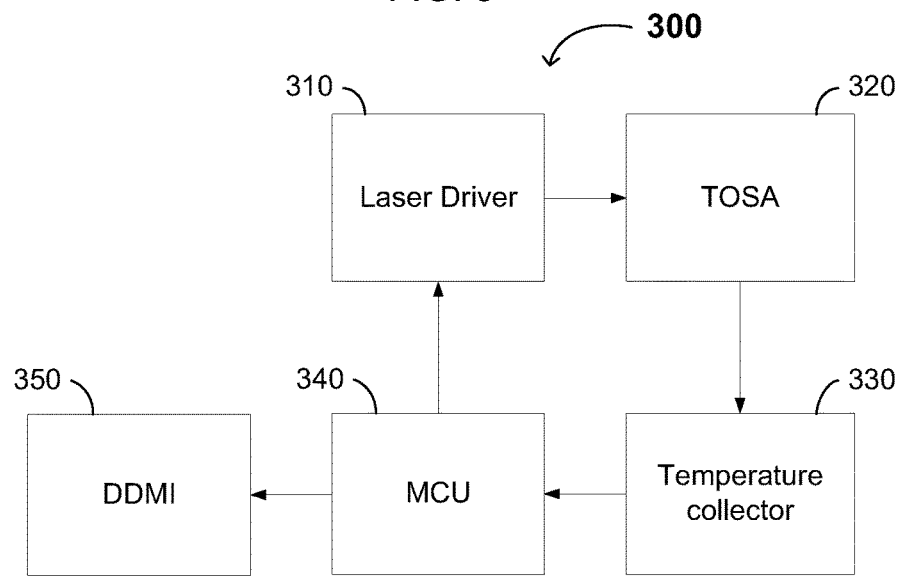
FIG. 3 is a schematic diagram showing a first exemplary optical module in accordance with one or more embodiments of the present invention.

FIG. 3 illustrates an optical module 300 in accordance with one or more embodiments of the present invention, including a laser driver 310, a TOSA 320 receiving a driving current or equivalent output from the laser driver 310, a microprocessor 340 connected with the TOSA 320 via a temperature data collector 330 (e.g., temperature sensor), and an electrical interface (e.g., a digital diagnostic and/or monitoring interface [DDMI]) 350. The TOSA 320 includes a laser diode (not shown) and, optionally, a modulator (e.g., an electroamplitude modulator) and/or a monitor photo-diode, which feeds back a current or voltage to the MCU 340 corresponding to an optical output power of the laser diode in the TOSA. The temperature data collector 330 provides a current or voltage corresponding to the operating temperature of the laser diode in the TOSA 320 in real time to the MCU 340. The microprocessor 340 is configured to receive the operating temperature from the temperature data collector 330, either as an analog signal (e.g., current) or a digital signal (e.g., a voltage, from an analog-to-digital converter receiving the current from the current from the temperature data collector 330), and report the TOSA output power according to the TE value at the operating temperature in the lookup table at the interface 350 when the TOSA is in operation. In addition, the lookup table is made in advance (as described herein), and contains the TE values at various temperatures in the operating temperature range of the transmitter/module in a one-to-one relationship. The lookup table may be stored in the microprocessor 340.

The present invention is not intended to limit the type of optical module. Therefore, the optical module may be an SFP+ optical module, an SFP optical module, a CSFP optical module, a QSFP optical module, an SFF optical module, etc.

Specifically, the lookup table containing the TOSA TE values at various temperatures in a one-to-one mapping relationship is made in advance as described herein and/or as summarized hereinafter: the output power of a laser in a TOSA is measured at 25° C.; the output power value of the laser in the TOSA is measured at N additional individual temperatures to obtain N tracking error values (TE values) corresponding to the N individual temperature values; a lookup table including the full operating temperature range of the laser is created by a fitting a line to the measured output powers as a function of the temperature of the laser, and TE values at one or more further laser operating temperatures between each of the optical output power measurements are calculated; and the temperatures for which TE values are measured or determined and the corresponding TE values are stored in a memory.

Preferably, the N individual temperature values for optical output power measurement are determined by the equation T=−40° C.+(α*M), where T represents an individual temperature value for an optical output power measurement, α is an integer that ranges from 0 to Q, M represents a temperature interval between two adjacent temperature values, and Q is an integer rounded up or down from P/M, where P is the difference between the highest and lowest temperatures in the operating temperature range for which output powers are measured. For example P=125 when the difference between the endpoints of the testing temperature are 85° C. and −40° C.

Preferably, the temperature interval M is 3° C., 5° C., 10° C., 20° C., or 30° C. The smaller the temperature interval, the larger the data size achieved by testing, and the higher accuracy for output power compensation. If P=125 and M equal 5° C., the value of a is 25. That is to say, 25 TE values are measured at 25 different temperatures, and then a lookup table covering the full operating temperature range of the laser can be created by a line fitting process based on the 25 TE values and the 25 individual temperature values, and a TE value determination is made at one or more temperatures between each of the adjacent individual temperatures at which the optical output power is measured. For example, when the temperature interval M is 5° C., the TE value may be determined at 1° C. increments between the adjacent individual measurement temperatures from the fitted line. Thus, the lookup table can store measured or determined TE values for each 1° C. temperature increment between endpoints of the operating temperature range of the laser.

The exemplary optical transmitter/module and the exemplary method include one or more common concepts. In the exemplary optical transmitter/module, the exemplary method may be utilized to implement a pretest or test measurement process to obtain the lookup table, and then to use the lookup table to report the TOSA output power based on the tracking error at the operating temperature when the optical transmitter/module is in operation. The details of creating the lookup table can be found in the description of the exemplary method.

In the present optical module reports the TOSA optical output power at the electrical interface 350 based on the tracking error at the operating temperature, determined by the one-to-one mapping relationship between the tracking error values and temperatures (and, in general, the line fitting process), thereby effectively improving the monitoring and/or reporting accuracy of TOSA transmitter power.

Figure 4:
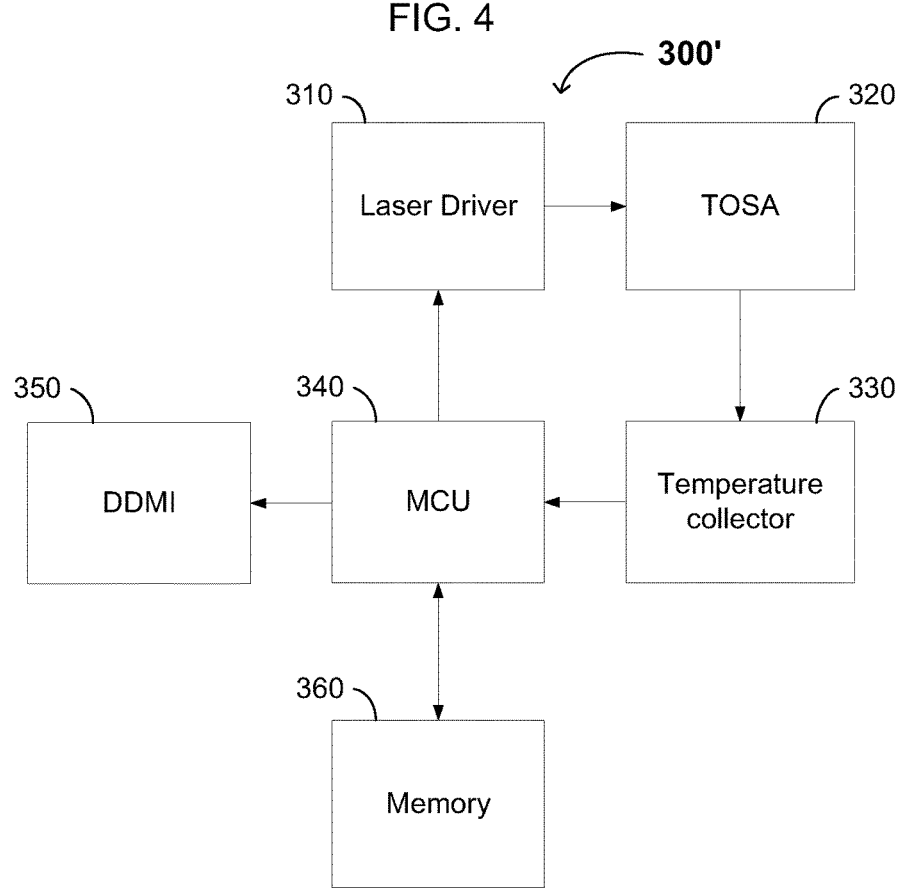
FIG. 4 is a schematic diagram showing a second exemplary optical module in accordance with one or more embodiments of the present invention.

FIG. 4 illustrates another exemplary optical transmitter and/or optical module 300' in accordance with one or more further embodiments of the present invention. The optical transmitter and/or optical module 300 (FIG. 3) is included in the optical transmitter and/or optical module 300'. The optical module 300' of FIG. 4 further includes one or more memories (e.g., random-access and/or volatile memory cells, such as in one or more registers or register banks, of nonvolatile memory such as EEPROM cells), where the lookup table is stored after it is created. The microprocessor 340 reads the lookup table from the memory 360 and reports the TOSA optical output power at the electrical (e.g., digital diagnostic and/or monitoring) interface 350 based on the tracking error in the lookup table at the laser operating temperature when the optical module is in operation.

The optical module 300' reports the TOSA optical output power based on the tracking error at the laser operating temperature in the lookup table formed by the one-to-one mapping relationship between the measured and/or determined tracking error values and corresponding temperatures, thereby effectively improving the monitoring and/or reporting accuracy of TOSA transmitter power.

Exemplary Optical Communication System(s)

Figure 5:
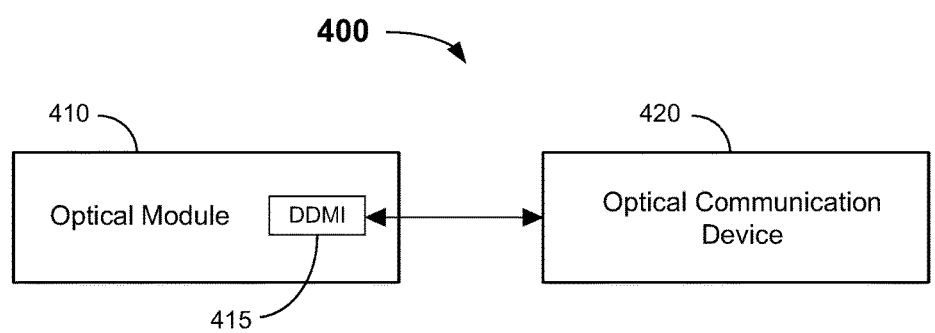
FIG. 5 is a schematic diagram showing an exemplary optical communication system in accordance with one or more embodiments of the present invention.

FIG. 5 illustrates an exemplary optical communication system 400, including an optical communication device 420 and an optical module 410 (e.g., the present optical module 300 or 300' in FIGS. 3-4). The optical communication device 420 communicates with at least one optical module 410 via an electrical (e.g., digital diagnostic and/or monitoring) interface 415, and vice versa.

The optical module 410 (e.g., an SFP+ optical module) can be connected with optical communication devices 420 having slots to receive optical modules in a standardized package via a standard interface, such as an SFP+ standard port. The standard electrical interface of the optical module 410 is plugged into the standard-compatible slot, such that the optical module 410 and the optical communication device 420 can communicate with each other. Relevant content of the optical module 410 can be found in the descriptions of the optical transmitters and/or optical modules 300 or 300' in FIGS. 3-4. However, the present optical module is not intended to be limited to any particular type of package, so the optical module can be another type of standard-compliant optical module package, such as an SFP-compliant package, an SFP+-compliant package, a CSFP-compliant package, etc.

The present optical communication system 500 is not intended to be limited to a particular type of optical communication device. Thus, the optical communication device 420 can be a data communication optical transceiver, a telecom optical module, a fiber switch, an OLT, an ONU, a PON, or any other optical communication device.

The exemplary optical module 410 reports the TOSA optical output power at the electrical interface 415 based on the tracking error at the operating temperature using the lookup table formed by the one-to-one mapping relationship between the measured or determined tracking error values and corresponding temperatures, thereby effectively improving the monitoring and/or reporting accuracy of TOSA transmitter power.

CONCLUSION/SUMMARY

Embodiments of the present invention can advantageously provide a method, optical module, and optical communication system for improving the monitoring and/or reporting accuracy of a TOSA transmitter power. To improve the monitoring and/or reporting accuracy of TOSA (e.g., laser) transmitting power and the reported value of the same at an interface (e.g., a DDMI) between the optical transmitter or transceiver and an external device to which the optical transmitter or transceiver is connected, embodiments of the present invention may measure the output power value of a laser in a TOSA at a plurality of individual temperatures to obtain a plurality of tracking error values (TE values) corresponding to the individual temperature values, and then create a lookup table within an operating temperature range including (or defined by) the individual temperature values based on a one-to-one mapping relationship between the TE values and the individual temperature values, then plotting a line from those TE and temperature values using a line fitting process to determine TE values at additional temperatures (e.g., other than the measurement temperatures). When the laser or TOSA is in operation, one may report the stored TOSA TE values to compensate for variations or differences between the measured value and the actual value of the TOSA output power at the operating temperature according to the TE values in the lookup table.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for controlling an output power of an optical transmitter, comprising:
    measuring an output power value of the optical transmitter at 25° C.;
    measuring the output power value of the optical transmitter at N additional individual temperatures to obtain N tracking error values (TE values) corresponding to said N additional individual temperature values, where N is an integer that is equal to or greater than 1;
    creating a lookup table covering an operating temperature range of the optical transmitter including said N individual temperature values based on one-to-one mapping between said TE values and said N additional individual temperature values; and
    after creating said lookup table and when said optical transmitter is in operation, reporting at an electrical digital diagnostic and/or monitoring interface of said optical transmitter an operating temperature of said optical transmitter, a corresponding one of said TE values from said lookup table, and an optical output power of said optical transmitter.

2. The method of claim 1, further comprising performing a line fitting process on said N temperature values and said N TE values, and determining additional TE values at each of one or more temperatures between adjacent ones of the N additional individual temperature values from the line.

3. The method of claim 1, wherein said temperature range is from 20° C. to 85° C.

4. The method of claim 1, wherein reporting said one of said TE values comprises determining an actual temperature of said optical transmitter, reading said corresponding one of said TE values corresponding to said actual temperature from said lookup table, and providing said optical output power at said interface of said optical transmitter using said corresponding one of said TE values from the lookup table.

5. The method of claim 1, wherein said optical transmitter comprises (i) a laser diode configured to transmit an optical signal having the optical output power and (ii) a monitoring photodiode configured to feed back a signal having a value corresponding to the optical output power of the laser diode.

6. The method of claim 2, wherein said temperature range is from −40° C. to 85° C.

7. The method of claim 6, wherein said N additional individual temperature values are determined by the equation T=−40° C.+(α*M), where T represents an individual one said N additional individual temperature values, α is an integer that ranges from 0 to Q, M represents a temperature interval between two adjacent temperature values of said N additional individual temperature values, and Q is a nearest integer to, or an integer rounded up or down from, 125/M.

8. The method of claim 7, wherein M is from 3° C. to 30° C.

9. An optical transmitter, comprising:
    a laser driver;
    a transmitter optical subassembly (TOSA) connected to the laser driver;
    a temperature data collector, said temperature data collector being configured to determine and report the operating temperature of said TOSA in real time;
    a lookup table that contains TOSA tracking error (TE) values at a plurality of temperatures in a one-to-one mapping relationship;
    an electrical digital diagnostic and/or monitoring interface configured to enable a user to monitor data of the optical transmitter; and
    a microprocessor connected with said TOSA via said temperature data collector, said microprocessor being configured to receive said operating temperature from said temperature data collector and report the operating temperature of said optical transmitter, a corresponding one of said TOSA TE values at the operating temperature in said lookup table, and an optical output power of said optical transmitter at said interface when said TOSA is in operation.

10. The optical transmitter of claim 9, wherein said TOSA TE values include TE values from output power values of the TOSA measured at N individual temperatures, where N is an integer that is greater than 1.

11. The optical transmitter of claim 9, wherein said microprocessor includes said lookup table.

12. The optical transmitter of claim 9, further comprising a memory storing said lookup table, wherein said memory is readable by said microprocessor.

13. An optical module, comprising the optical transmitter of claim 9.

14. The optical transmitter of claim 10, wherein said TOSA TE values include TE values at temperatures other than said N individual temperature values, determined from a line fitted to said TE values from said measured output powers of the TOSA and said N individual temperature values.

15. The optical transmitter of claim 10, wherein said N individual temperature values are from 20° C. to 85° C.

16. The optical transmitter of claim 10, wherein said N individual temperature values are from −40° C. to 85° C.

17. The optical transmitter of claim 10, wherein said N individual temperature values are determined by the equation T=−40° C.+($\alpha$*M), where T represents an individual one said N additional individual temperature values, $\alpha$ is an integer that ranges from 0 to Q, M represents a temperature interval between two adjacent temperature values of said N additional individual temperature values, and Q is a nearest integer to, or an integer rounded up or down from, 125/M.

18. An optical communication system, comprising the optical module of claim 13, and one or more optical communication devices connected with said optical module.

19. The optical communication system of claim 18, wherein said optical communication device is a data communication optical transceiver, a telecom optical module, a fiber switch, an OLT, an ONU or a PON.

20. The optical transmitter of claim 17, wherein M is from 3° C. to 30° C.

* * * * *